US 9,502,868 B2

United States Patent
Kagawa et al.

(10) Patent No.: US 9,502,868 B2
(45) Date of Patent: Nov. 22, 2016

(54) GAS-INSULATED SWITCHGEAR

(71) Applicant: Mitsubishi Electric Corporation, Chiyoda-ku, Tokyo (JP)

(72) Inventors: Koichi Kagawa, Tokyo (JP); Tadahiro Yoshida, Tokyo (JP); Masahiro Arioka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/651,070

(22) PCT Filed: May 31, 2013

(86) PCT No.: PCT/JP2013/065156
§ 371 (c)(1),
(2) Date: Jun. 10, 2015

(87) PCT Pub. No.: WO2014/112135
PCT Pub. Date: Jul. 24, 2014

(65) Prior Publication Data
US 2015/0311684 A1 Oct. 29, 2015

(30) Foreign Application Priority Data
Jan. 15, 2013 (JP) .................... 2013-004281

(51) Int. Cl.
*H02B 5/06* (2006.01)
*H02B 13/035* (2006.01)

(52) U.S. Cl.
CPC ............ *H02B 5/06* (2013.01); *H02B 13/0352* (2013.01); *H02B 13/0358* (2013.01)

(58) Field of Classification Search
CPC ...... H02B 5/06; H02B 13/035; H02B 13/01; H02B 13/045; H02B 1/20; H02B 1/26; H01H 33/02; H01H 33/66; H01H 33/662; H01H 33/00; H01H 33/18
USPC ................ 361/602–621, 624–634, 673, 829, 361/807–810, 830, 832; 218/2, 7, 10–14, 218/43–47, 67–73, 80–84, 152–158
See application file for complete search history.

(56) References Cited

U.S. PATENT DOCUMENTS

| | | | | |
|---|---|---|---|---|
| 4,744,002 A | * | 5/1988 | Nakano | .................... H02B 1/22 218/80 |
| 4,837,662 A | * | 6/1989 | Takeuchi | ................. H02B 1/22 361/612 |

(Continued)

FOREIGN PATENT DOCUMENTS

| | | |
|---|---|---|
| JP | 51-143844 A | 12/1976 |
| JP | 6-311614 A | 11/1994 |

(Continued)

OTHER PUBLICATIONS

Office Action issued on May 24, 2016, by the Japanese Patent Office in corresponding Japanese Patent Application No. 2015-120802 and partial English translation of the Office Action. (4 pages).

(Continued)

*Primary Examiner* — Michail V Datkovskiy
(74) *Attorney, Agent, or Firm* — Buchanan Ingersoll & Rooney PC

(57) ABSTRACT

A circuit breaker is accommodated in a circuit breaker compartment such that a contacting/separating direction of a contact of the circuit breaker is along a vertical direction, a cable terminal of a first cable connected to one terminal of the circuit breaker via a first disconnector is accommodated in a first connection compartment such that a central conductor of the cable terminal is along the vertical direction, and a disconnector compartment which accommodates the first disconnector such that a contacting/separating direction of a contact of the first disconnector is along the vertical direction, is joined so as to be disposed between the circuit breaker compartment and the first connection compartment.

10 Claims, 4 Drawing Sheets

(56) References Cited

U.S. PATENT DOCUMENTS

| | | | |
|---|---|---|---|
| 4,890,193 A | 12/1989 | Tsubaki | |
| 5,099,389 A * | 3/1992 | Ciboldi | H02B 13/035 174/17 GF |
| 5,898,565 A * | 4/1999 | Yamauchi | H02B 1/22 337/28 |
| 6,515,247 B1 * | 2/2003 | Tsuzura | H02B 1/22 218/43 |
| 7,193,172 B2 * | 3/2007 | Rokunohe | H01H 33/22 218/43 |
| 7,417,846 B2 * | 8/2008 | Arioka | H02B 13/035 361/604 |
| 7,764,486 B2 * | 7/2010 | Otsuka | H02B 1/22 218/43 |
| 8,946,581 B2 * | 2/2015 | Yabu | H01H 33/66207 218/119 |
| 2002/0060204 A1 * | 5/2002 | Tohya | H02B 13/055 218/155 |
| 2006/0186091 A1 * | 8/2006 | Rokunohe | H01H 33/22 218/43 |
| 2015/0311684 A1 | 10/2015 | Kagawa et al. | |

FOREIGN PATENT DOCUMENTS

| | | |
|---|---|---|
| JP | 8-205338 A | 8/1996 |
| JP | 2008-283734 A | 11/2008 |
| JP | 2012-231576 A | 11/2012 |
| WO | 2014/112135 A1 | 7/2014 |

OTHER PUBLICATIONS

Extended European Search Report dated Jun. 1, 2016, issued by the European Patent Office in the corresponding European Application No. 13871446.4. (5 pages).

International Search Report (PCT/ISA/210) mailed on Jul. 2, 2013, by the Japanese Patent Office as the International Searching Authority for International Application No. PCT/JP2013/065156.

* cited by examiner (a)  (b)

(c)

GAS-INSULATED SWITCHGEAR

TECHNICAL FIELD

The present invention relates to gas-insulated switchgears for use in electric power transmission/distribution and reception facilities.

BACKGROUND ART

In conventional gas-insulated switchgears, switching devices such as circuit breakers and disconnectors are disposed so as to be elongated in the depth direction such that the axes of the switching devices are along the horizontal direction, and cable connecting portions for cable lead-in or cable lead-out are arranged in the rear of the switching devices, in many cases. In these cases, a depth dimension of the switchgear depends on the size of the switching devices, and the installation area has been difficult to reduce.

On the other hand, as a device having a configuration in which a circuit breaker is disposed so as to extend along the vertical direction, for example, a gas-insulated switchgear is disclosed in which a bus-side disconnector connected to a bus is accommodated in a first compartment in insulation gas atmosphere, and a circuit breaker is disposed in a second compartment, in insulation gas atmosphere, separated from the first compartment such that the axis of the circuit breaker is along the vertical direction, one terminal of the circuit breaker is connected to the bus-side disconnector, and the other terminal thereof is connected to a cable-side disconnector disposed in the rear of the circuit breaker in the second compartment, to be led out through a cable (see, for example, Patent Document 1).

CITATION LIST

Patent Document

Patent Document 1: Japanese Laid-Open Patent Publication No. 08-205338 (Page 3, FIG. 1)

SUMMARY OF THE INVENTION

Problems to be Solved by the Invention

In a case where the gas-insulated switchgear has a configuration in which a switching device such as a circuit breaker is disposed such that the axis thereof extends horizontally in the depth direction, a depth dimension of the switchgear has been difficult to reduce. On the other hand, in a case where the switching device is disposed so as to extend along the vertical direction as disclosed in Patent Document 1, a depth dimension can be reduced as compared to the device extending horizontally. However, according to Patent Document 1, one end of the circuit breaker is connected to a bus. If this is directly applied to a configuration in which connection of the circuit breaker on both a lead-in side and a lead-out side is performed by using cables, handling and processing in manufacturing are limited due to, for example, limitation in cable guiding direction or disposition of compartments having the cables accommodated therein, and the degree of freedom for disposition in the case of the switchgear being mounted is reduced, and a problem with reduction of installation area also arises.

The present invention is made in order to solve the aforementioned problem, and an object of the present invention is to provide a gas-insulated switchgear in which directions in which devices to be accommodated are disposed and compartments in which the devices are accommodated, are appropriately designed, the degree of freedom for connection to cables is excellent, and installation area can be reduced.

Solution to the Problems

In a gas-insulated switchgear according to the present invention, a circuit breaker is accommodated in a circuit breaker compartment such that a contacting/separating direction of a contact of the circuit breaker is along a vertical direction, a cable terminal of a first cable connected to one terminal of the circuit breaker via a first disconnector is accommodated in a first connection compartment such that a central conductor of the cable terminal is along the vertical direction, a cable terminal of a second cable connected to the other terminal of the circuit breaker directly or via a second disconnector is accommodated in a second connection compartment such that a central conductor of the cable terminal is along the vertical direction, insulation gas is sealed in each of the compartments, the first connection compartment and the second connection compartment are joined to the circuit breaker compartment so as to be aligned horizontally in one direction or in opposite directions relative to the circuit breaker compartment, and a circuit breaker operating mechanism for switching the circuit breaker is disposed on an outer side, of the circuit breaker compartment, in the contacting/separating direction of the contact.

Effect of the Invention

In the gas-insulated switchgear according to the present invention, to the circuit breaker compartment in which the circuit breaker is accommodated such that the contacting/separating direction of the contact thereof is along the vertical direction, the first connection compartment in which the cable terminal of the first cable is accommodated such that the central conductor thereof is along the vertical direction, and the second connection compartment in which the cable terminal of the second cable is accommodated such that the central conductor thereof is along the vertical direction, are individually joined. The circuit breaker operating mechanism is disposed on the outer side, of the circuit breaker compartment, in the contacting/separating direction of the contact. Therefore, a gas-insulated switchgear can be provided in which the degree of freedom for combination of each connection compartment with the circuit breaker compartment is enhanced, and thus the degree of freedom in connection to the cables is excellent.

Further, the devices such as the circuit breaker and the cable terminal are each accommodated in an individual compartment for each device. Therefore, handling in manufacturing of products is facilitated, and limitation in processing and assembling of components is reduced.

Further, no great projection such as the operating device is formed on the outer circumferential surface of the entirety of the compartment of the gas-insulated switchgear. Therefore, the gas-insulated switchgear can be disposed so as to be close to a wall surface of the installation portion and an adjacent device.

DESCRIPTION OF EMBODIMENTS

Embodiment 1

Figure 1:
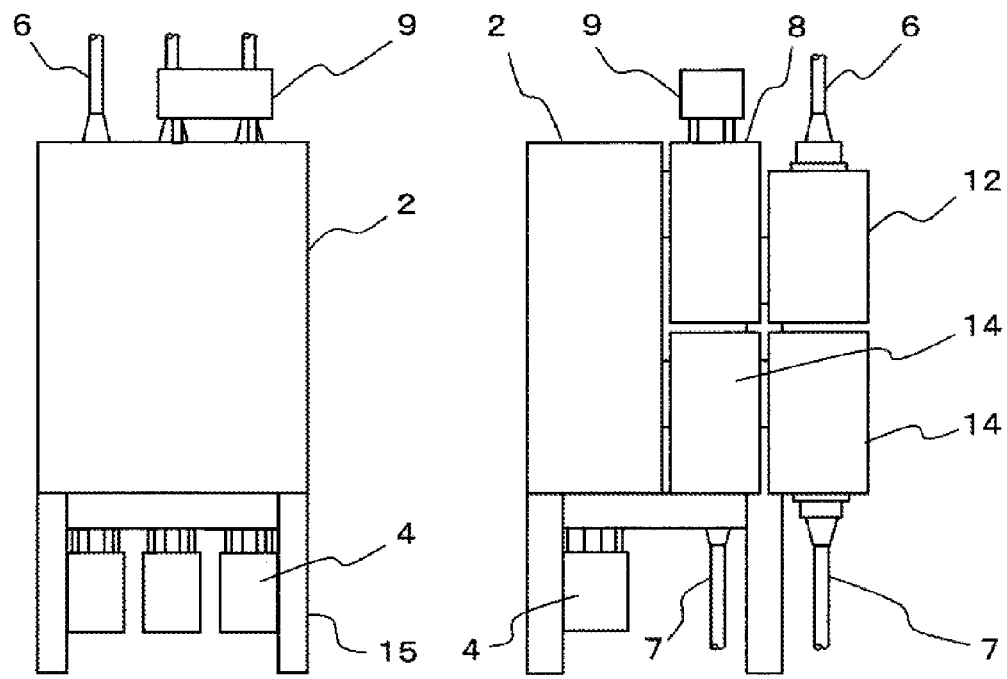
FIG. 1 is a schematic external view of a gas-insulated switchgear according to embodiment 1 of the present invention.
Figure 1:
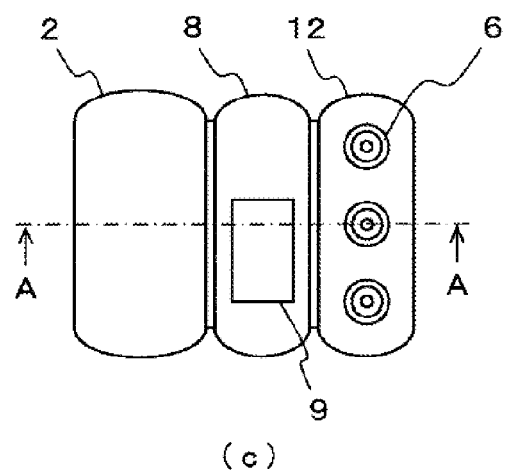
Figure 2:
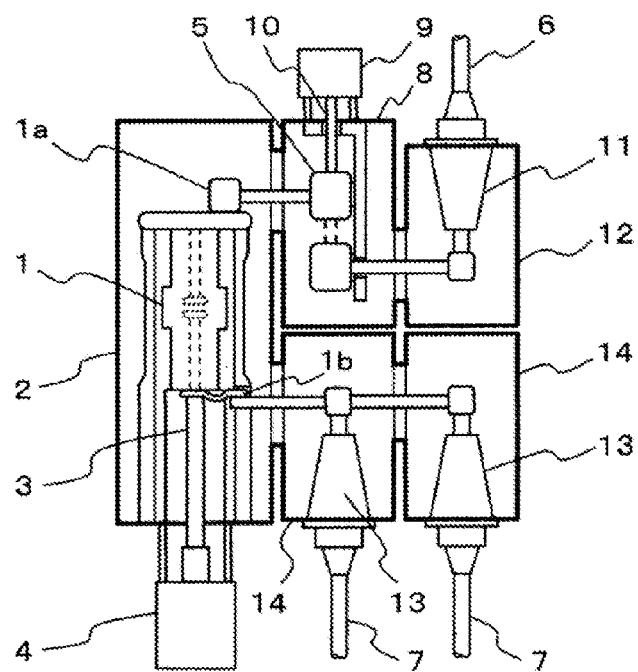
FIG. 2 is a side sectional view as viewed in a direction of an arrow A-A in FIG. 1(c).

FIG. 1 is a schematic external view of a gas-insulated switchgear according to embodiment 1. (a) is a front view thereof, (b) is a side view thereof, and (c) is a top view thereof. Further, FIG. 2 is a side sectional view as viewed in a direction of an arrow A-A in FIG. 1(c). However, in FIG. 2, a base frame portion is not shown. The following description will be given with reference to the drawings. For convenience of description, a side which is seen in the direction shown in FIG. 1(a) represents a front side.

In FIG. 1 and FIG. 2, a circuit breaker 1 of the gas-insulated switchgear is accommodated in a circuit breaker compartment 2 having insulation gas sealed therein such that a contacting/separating direction of a contact of the circuit breaker is almost along the vertical direction, that is, such that the longitudinal direction of the circuit breaker 1 is almost along the vertical direction.

The circuit breaker 1 has a fixed contact and a movable contact accommodated in an arc extinguishing chamber, and the fixed contact is at the upper side, and the movable contact is at the lower side in the case shown in FIG. 2. The fixed contact is connected to one terminal 1a, and is fixed on the circuit breaker compartment 2 side via an insulating member. On the other hand, the movable contact is connected to the other terminal 1b, and joined to a driving shaft 3 disposed on the axis along the contacting/separating direction of the contact. Further, the driving shaft 3 is joined to a circuit breaker operating mechanism 4 disposed on the outer side, of the circuit breaker compartment 2, in the contacting/separating direction of the contact, that is, disposed on the lower side of the circuit breaker compartment 2 in the drawings.

The one terminal 1a of the circuit breaker 1 is electrically connected to a first cable 6 via a first disconnector 5, and the other terminal 1b of the circuit breaker 1 is electrically connected to a second cable 7.

The first disconnector 5 is accommodated and mounted in a disconnector compartment 8 having insulation gas sealed therein such that the contacting/separating direction of a contact of the first disconnector is almost along the vertical direction. A disconnector operating mechanism 9 is disposed on the outer side, of the disconnector compartment 8, in the contacting/separating direction of the contact of the disconnector, that is, disposed on the upper side of the disconnector compartment 8 in the drawings, and is joined by means of a driving shaft 10.

The first disconnector 5 may serve not only as a disconnector having a normal disconnecting function, but also as a three-position disconnector that has a disconnecting function and a grounding function of a grounding switch, that is, that can switch between three positions of ON, OFF, and grounding. The same applies to a second disconnector described in the following embodiment.

A cable terminal 11 of the first cable 6 is accommodated and mounted in a first connection compartment 12 having insulation gas sealed therein such that the central conductor of the cable terminal is almost along the vertical direction.

The disconnector compartment 8 is joined to the rear side of the circuit breaker compartment 2, and the first connection compartment 12 is joined to the rear side of the disconnector compartment 8 so as to form an integral structure. In other words, the first connection compartment 12 is joined to the circuit breaker compartment 2 via the disconnector compartment 8.

By means of connection conductors, the one terminal 1a of the circuit breaker 1 is connected to one terminal of the disconnector 5, and the other terminal of the disconnector 5 is connected to the central conductor of the cable terminal 11.

On the other hand, a cable terminal 13 of the second cable 7 that is electrically connected to the other terminal 1b of the circuit breaker 1 is accommodated and mounted in a second connection compartment 14 having insulation gas sealed therein such that the central axis of the cable terminal is almost along the vertical direction. The second connection compartment 14 is joined to the rear side of the circuit breaker compartment 2. The other terminal 1b of the circuit breaker 1 and the central conductor of the cable terminal 13 are connected to each other by means of a connection conductor.

The first cable 6 is led in from the upper side, and the second cable 7 is led out from the lower side. That is, according to the present embodiment, the first cable 6 and the second cable 7 are led in the opposite directions along the vertical direction.

In the case shown in FIG. 1 and FIG. 2, two lines of the second cable 7 are led out. Therefore, two second connection compartments 14 are joined in the depth direction. The cable terminals 13 are accommodated in the second connection compartments 14, respectively, and are connected to each other by means of a connection conductor.

As described above, at least one line of the first cable 6 is connected to the upper side terminal 1a of the circuit breaker 1 and at least one line of the second cable 7 is connected to the lower side terminal 1b thereof. The greater the number of the lines is, the greater the number of compartments joined in the depth direction can be. The same applies to the other embodiments.

Each of the compartments 2, 8, 12, and 14 is supported by a base frame 15 as shown in FIG. 1.

The devices for three phases are accommodated in each compartment so as to be aligned in a single compartment in the left-right direction. Therefore, the shape as viewed from above the top of the compartment is a rectangular shape that is elongated in the left-right direction on the front side and that has the opposing left and right side surfaces expanded, as shown in the top view of FIG. 1(c). However, the shape is not limited thereto, and may be a simple rectangular shape or an ellipsoidal shape.

Next, an operation of the gas-insulated switchgear having such a configuration will be described.

In general, in switchgears as arranged side-by-side, one terminal of a circuit breaker of each of the side-by-side arranged switchgears is connected to a common bus. However, the present invention is particularly applicable to a gas-insulated switchgear having a relatively simple circuit configuration in which side-by-side arrangement is unnecessary, and cables are provided on both the lead-in side and the lead-out side of the circuit breaker, whereby an installation area can be reduced, and applicable installation locations are increased, as described below.

Examples of the simple circuit configuration include a switching device that is mounted in wind power generation facilities and the like. In this case, cables with which turbines are associated with each other, and cables with which power generating energy for the turbines themselves is supplied, are collected, and the circuit breaker and the disconnector are disposed as in the gas-insulated switchgear of the present embodiment, thereby sufficiently exhibiting its function.

The circuit breaker 1 and the first disconnector 5 are vertically disposed such that the contacting/separating direction of the contacts thereof is along the vertical direction. The circuit breaker operating mechanism 4 and the disconnector operating mechanism 9 are disposed on the outer side, of the compartments, in the contacting/separating direction of the respective contacts. The cable terminals 11, 13 are disposed such that the central axes thereof are along the vertical direction. Further, the circuit breaker compartment 2 having the circuit breaker 1 accommodated therein, the disconnector compartment 8 having the first disconnector 5 accommodated therein, and the first and the second connection compartments 12, 14 having the cable terminals 11, 13, respectively, accommodated therein are formed as separate compartments, and the separate compartments are integrally joined to each other. Thus, the degree of freedom with which the first connection compartment 12 and/or the second connection compartment 14 are disposed relative to the circuit breaker compartment 2, is enhanced. In a case where the compartments are disposed as shown in FIGS. 1 and 2, the second connection compartments 14 for two lines of the cable can be disposed on the lower side of the disconnector compartment 8 and the lower side of the first connection compartment 12, and when the first and the second cables 6 and 7 are led out in the opposite directions along the vertical direction, the entirety of the compartments are collected so as to be compact, and the installation area can be reduced.

Further, no great projection is formed on the front side surface, the rear side surface, the left side surface, and the right side surface of the compartment of the entirety of the gas-insulated switchgear that is integrally formed. Therefore, all of the surfaces can be disposed so as to be close to the wall surfaces of the installation portion and an adjacent device.

Further, the compartment is divided for each of devices, such as the circuit breaker 1, the disconnector 5, and the cable terminals 11 and 13, to be accommodated, thereby facilitating handling in manufacturing of the product, and reducing limitation in processing of components.

Furthermore, in case of failure, disassembling and restoration can be performed for each compartment. Therefore, the present invention is appropriate for, for example, electric facilities, such as wind power generation facilities, which have limitation in installation location and carrying-in operation, and for which a time in which power can be interrupted is short. Moreover, the number of each of the cable terminals 11 and 13 can be easily increased so as to be expanded in the depth direction according to the number of lines to be used.

In FIGS. 1 and 2, the first disconnector 5 is accommodated in the disconnector compartment 8. However, the first connection compartment 12 may be enlarged to accommodate the first disconnector 5 and the cable terminal 11 thereinside.

Further, in FIGS. 1 and 2, the disconnector compartment 8 and the first connection compartment 12 joined to the upper side portion of the circuit breaker compartment 2, and the second connection compartments 14 joined to the lower side portion thereof are both joined to the rear side of the circuit breaker compartment 2. However, either the disconnector compartment 8 and the first connection compartment 12, or the second connection compartments 14 may be joined to the front side of the circuit breaker compartment 2. In this case, the directions in which the cables are led out can be made the same.

Moreover, the dispositions shown in FIGS. 1 and 2 may be upside down.

As described above, in the gas-insulated switchgear according to embodiment 1, the circuit breaker is accommodated in the circuit breaker compartment such that the contacting/separating direction of the contact thereof is along the vertical direction, and the cable terminal of the first cable connected to one terminal of the circuit breaker via the first disconnector is accommodated in the first connection compartment such that the central conductor thereof is along the vertical direction, the cable terminal of the second cable connected to the other terminal of the circuit breaker directly or via the second disconnector is accommodated in the second connection compartment such that the central conductor thereof is along the vertical direction, insulation gas is sealed in each compartment, the first connection compartment and the second connection compartment are joined to the circuit breaker compartment so as to be aligned horizontally in one direction or in opposite directions relative to the circuit breaker compartment, and the circuit breaker operating mechanism for switching the circuit breaker is disposed on the outer side, of the circuit breaker compartment, in the contacting/separating direction of the contact thereof. Therefore, the degree of freedom for combination of each connection compartment with the circuit breaker compartment is enhanced, whereby a gas-insulated switchgear that is excellent in the degree of freedom for connection to cables can be obtained.

Further, accommodation in a separate compartment for each device such as the circuit breaker and the cable terminal facilitates handling in manufacturing of products, thereby reducing limitation in processing and assembling of components.

Further, no great projection such as an operating device is formed on the outer circumferential surface of the entirety of the compartment of the gas-insulated switchgear. Therefore, any of the front, rear, left, and right surfaces can be disposed so as to be close to wall surfaces of installation portions, or an adjacent device.

Moreover, the first disconnector is accommodated in the disconnector compartment such that the contacting/separating direction of the contact thereof is along the vertical direction, and the disconnector compartment has insulation gas sealed therein, and is joined so as to be disposed between the circuit breaker compartment and the first connection compartment. Therefore, in addition to the effect described above being obtained, when the first cable and the second cable are led out in opposite directions along the vertical direction, the entirety of the compartment can be made compact, thereby reducing the installation area.

Embodiment 2

Figure 3:
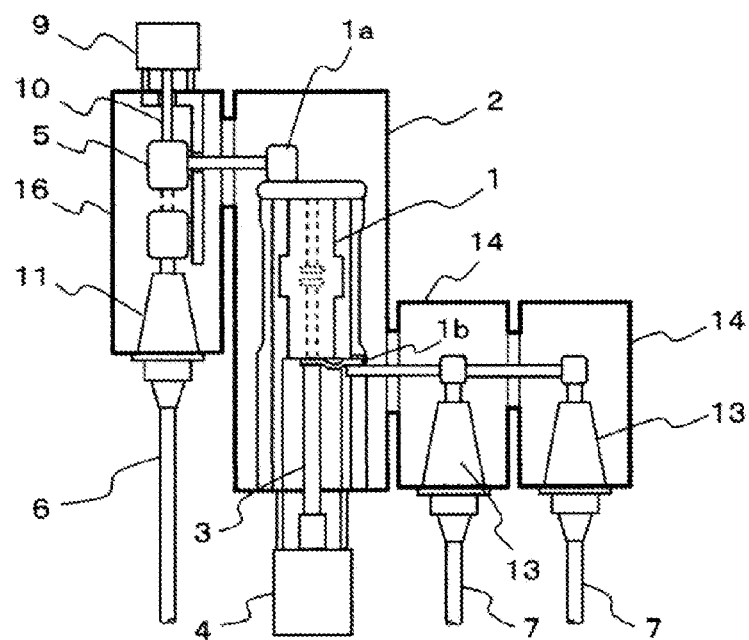
FIG. 3 is a side sectional view of a gas-insulated switchgear according to embodiment 2 of the present invention.

FIG. 3 is a schematic side sectional view of a gas-insulated switchgear according to embodiment 2. FIG. 3 corresponds to FIG. 2 for embodiment 1. The same portions as shown in FIG. 2 are denoted by the same reference numerals, the description thereof is omitted, and the difference therebetween will be mainly described. The main difference therebetween is disposition of the first disconnector 5 and the cable terminal 11 of the first cable 6.

As in embodiment 1, the first disconnector 5 is connected between the one terminal 1a of the circuit breaker 1, and the central conductor of the cable terminal 11 of the first cable 6. However, in the present embodiment, as shown in FIG. 3, the first disconnector 5 is disposed so as to be aligned with the cable terminal 11 of the first cable 6 in line such that the contacting/separating direction of the contact of the first disconnector is almost along the vertical direction, and the first disconnector 5 and the cable terminal 11 are accommodated and mounted in a first connection compartment 16 having insulation gas sealed therein. The disconnector operating mechanism 9 is disposed on the outer side, of the first connection compartment 16, in the contacting/separating direction of the contact of the disconnector, that is, disposed on the upper side in the drawings, and joined by means of the driving shaft 10.

The first connection compartment 16 is joined to the front side of the circuit breaker compartment 2. That is, the first connection compartment 16 is joined to the circuit breaker compartment 2 on the side opposite to the side on which the second connection compartment 14 is joined to the circuit breaker compartment 2.

On the other hand, the second connection compartments 14 connected to the other terminal 1b side of the circuit breaker 1 are the same as described for embodiment 1, and the description thereof is omitted.

The first cable 6 and the second cable 7 are led out in the same direction along the vertical direction. In the drawing, both the cables are led out from the lower side. When the first connection compartment 16 and the second connection compartment 14 are mounted upside down, both the cables can be led out from the upper side. Further, one of the first connection compartment 16 or the second connection compartment 14 may be upside down. That is, the present embodiment can be applied so as to provide various dispositions of the cables.

Figure 4:
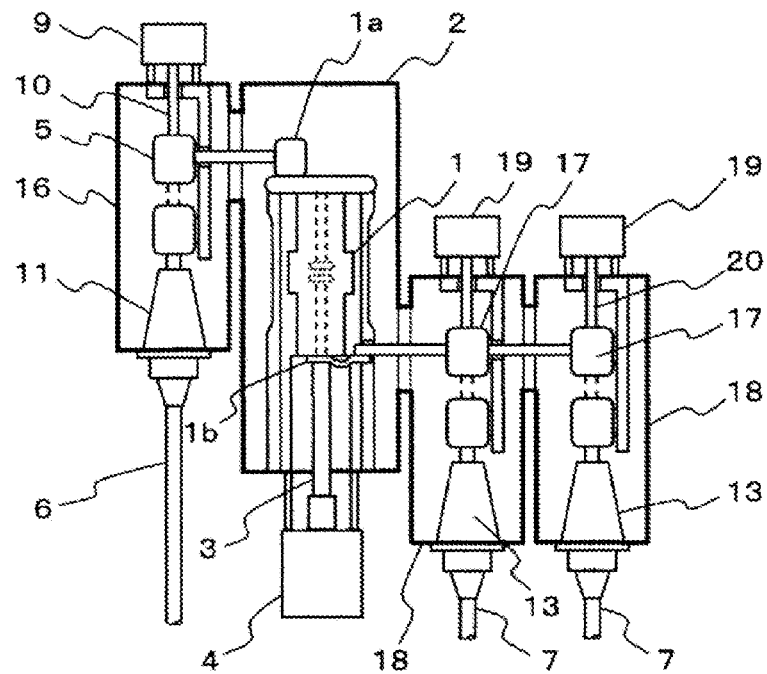
FIG. 4 is a side sectional view of another example of the gas-insulated switchgear according to embodiment 2 of the present invention.

Next, a modification of the structure shown in FIG. 3 will be described with reference to FIG. 4. The same portions as shown in FIG. 3 are denoted by the same reference numerals, the description thereof is omitted, and only the difference therebetween will be described. The difference from the structure shown in FIG. 3 is such that a second disconnector 17 is disposed between the other terminal 1b of the circuit breaker 1 and the cable terminal 13 of the second cable 7.

The second disconnector 17 is disposed so as to be aligned with the central conductor of the cable terminal 13 of the second cable 7 in line such that the contacting/separating direction of a contact of the second disconnector is almost along the vertical direction, and the second disconnector 17 and the cable terminal 13 are both accommodated and mounted in a second connection compartment 18. A disconnector operating mechanism 19 is disposed on the outer side, of the second connection compartment 18, in the contacting/separating direction of the contact of the disconnector, that is, disposed on the upper side in the drawings, and joined by means of a driving shaft 20.

The second connection compartment 18 is joined to the rear side of the circuit breaker compartment 2.

Both or one of the first connection compartment 16 and the second connection compartments 18 may be disposed upside down and joined to the circuit breaker compartment 2.

As described above, in the gas-insulated switchgear according to embodiment 2, the first disconnector is disposed so as to be aligned with the cable terminal of the first cable in line such that the contacting/separating direction of the contact thereof is along the vertical direction, and accommodated in the first connection compartment, and the first connection compartment is joined to the circuit breaker compartment on the side opposite to the side on which the second connection compartment is joined to the circuit breaker compartment. Therefore, in addition to the same effect as described for embodiment 1 being obtained, the present embodiment can be easily applied to a case where the cable lead-out direction and the cable lead-in direction are the same direction along the vertical direction, and a case where the cable lead-out direction and the cable lead-in direction are opposite to each other along the vertical direction.

Further, the other terminal of the circuit breaker and the cable terminal of the second cable are connected via the second disconnector, and the second disconnector is disposed so as to be aligned with the cable terminal of the second cable in line such that the contacting/separating direction of the contact thereof is along the vertical direction, and accommodated in the second connection compartment. Therefore, the disconnector is disposed between the circuit breaker and the cable, whereby the cable circuit can be disconnected for checking the cable or in the case of an accident, to enhance safety.

Embodiment 3

Figure 5:
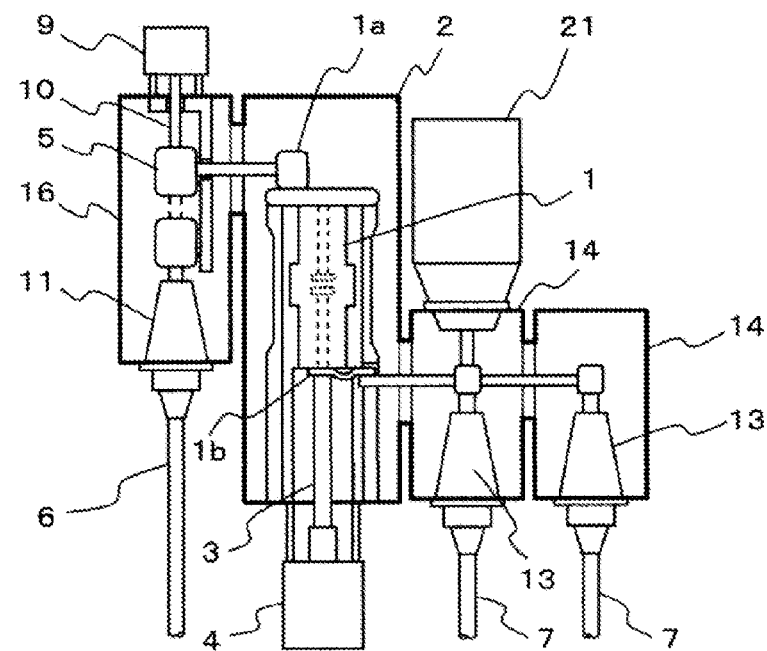
FIG. 5 is a side sectional view of a gas-insulated switchgear according to embodiment 3 of the present invention.

FIG. 5 is a schematic side sectional view of a gas-insulated switchgear according to embodiment 3. FIG. 5 corresponds to FIG. 3 for embodiment 2. The same portions as shown in FIG. 3 are denoted by the same reference numerals, the description thereof is omitted, and the difference therebetween will be mainly described.

The difference therebetween is such that an instrument transformer 21 is disposed at a connecting portion between the lower side terminal 1b of the circuit breaker 1 and the cable terminal 13 of the second cable 7. Specifically, as shown in FIG. 5, the instrument transformer 21 is disposed and mounted on the upper side of the second connection compartment 14. In FIG. 5, since two lines of the second cable 7 are led out, the instrument transformer 21 is mounted on the side opposite to the side on which the cable from the second connection compartment 14 closer to the circuit breaker compartment 2 is led out, that is, mounted on the upper side in the drawings, to be electrically connected to a conductor portion of the circuit.

When the instrument transformer 21 is provided in a circuit portion to which the cable of the gas-insulated switchgear is connected, voltage of a main circuit is monitored, and the system can be protected as appropriate. Further, a portion of secondary voltage of the instrument transformer 21 is supplied to the circuit breaker 1 and the disconnector 5, as, for example, control voltage to be supplied for operation regardless of whether or not the turbines are operating.

Further, since the instrument transformer 21 is disposed on the side opposite to the side on which the cable from the second connection compartment 14 is led out, a vacant space can be effectively used, and an installation space for the gas-insulated switchgear need not be increased even if the instrument transformer 21 is provided.

Figure 6:
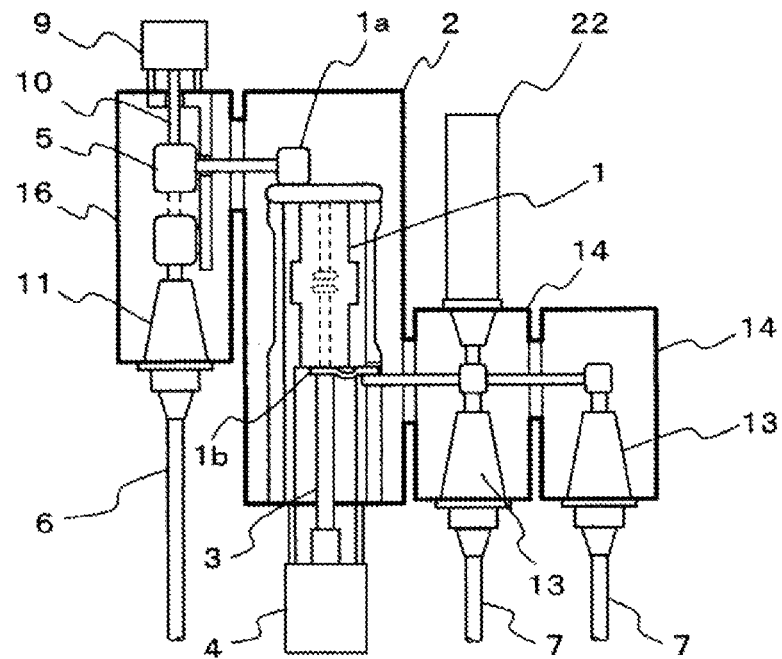
FIG. 6 is a side sectional view of another example of the gas-insulated switchgear according to embodiment 3 of the present invention.

Next, a modification of the gas-insulated switchgear shown in FIG. 5 will be described. FIG. 6 is a schematic side sectional view of a gas-insulated switchgear according to the modification of that shown in FIG. 5. The entirety of the configuration is similar to that in FIG. 5. Therefore, the similar portions are denoted by the same reference numerals, and the description thereof is omitted.

As shown in FIG. 6, instead of the instrument transformer 21 shown in FIG. 5, an arrester 22 is disposed at almost the same position as described for the instrument transformer 21.

In such a configuration, the arrester 22 is mounted by using a vacant space on the upper side of the second connection compartment 14, whereby the arrester 22 can be mounted without increasing the installation area for the gas-insulated switchgear, and protect the system from surge current generated in an accident.

As described above, in the gas-insulated switchgear according to embodiment 3, the instrument transformer that is electrically connected to the other terminal of the circuit breaker is mounted on the side opposite to the side on which the cable from the second connection compartment is led out, whereby the instrument transformer is provided without increasing an installation space for the entirety of the switchgear, voltage of the main circuit can be monitored, and the system can be protected.

Further, the arrester that is electrically connected to the other terminal of the circuit breaker is mounted on the side opposite to the side on which the cable from the second connection compartment is led out, whereby the installation space for the entirety of the switchgear is not increased, and the system can be protected from surge current generated in an accident.

Embodiment 4

Figure 7:
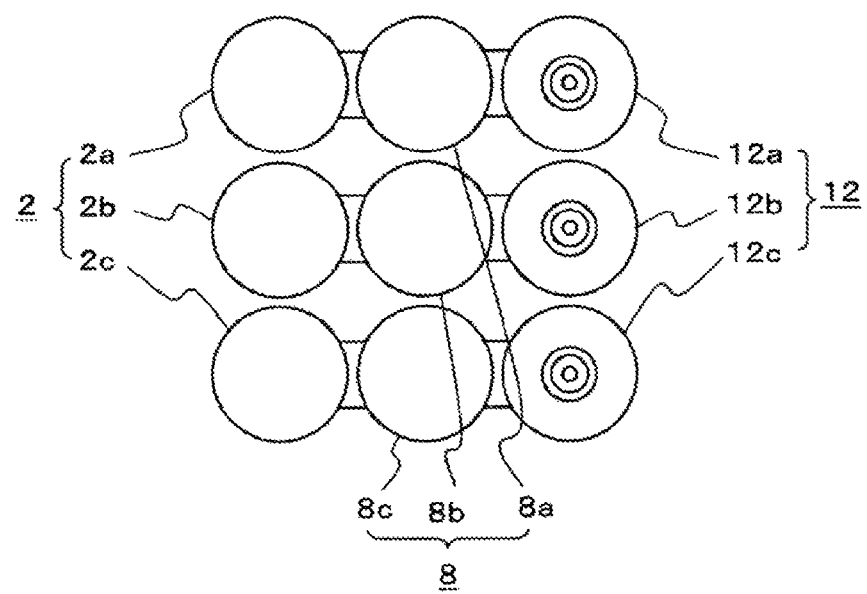
FIG. 7 is a top view of a gas-insulated switchgear according to embodiment 4 of the present invention.

FIG. 7 is a top view of a gas-insulated switchgear according to embodiment 4. FIG. 7 corresponds to FIG. 1(c) for embodiment 1. A side sectional view thereof is similar to FIG. 2.

In the case of FIG. 1(c), components for three phases are collected and accommodated in each compartment such as the circuit breaker compartment, the disconnector compartment, and the first and the second connection compartments.

On the other hand, according to the present embodiment, as shown in FIG. 7, the circuit breaker compartment, the disconnector compartment, and the first and the second connection compartments are each divided into divisional compartments for respective phases to accommodate components for respective phases. The circuit breaker compartment 2 includes circuit breaker divisional compartments 2a to 2c, the disconnector compartment 8 includes disconnector divisional compartments 8a to 8c, and the first connection compartment 12 includes first divisional connection compartments 12a to 12c. The divisional compartments for the respective phases are aligned in the left-right direction as viewed from the front side. In the drawings, only a region which can be seen from the top is shown. However, the divisional compartments of the second connection compartment 14 are similarly disposed on the lower side.

Furthermore, FIG. 7 shows the structure for each compartment described for embodiment 1. However, each compartment disposed in the structure as shown for embodiment 2 in FIG. 3 and FIG. 4 or disposed in the structure as shown for embodiment 3 in FIG. 5 and FIG. 6 may be divided for each phase so as to form similar compartment divisional portions. Further, the planar shape of each compartment divisional portion may be not only a circular shape as shown in 7, but also another shape such as a rectangular shape.

In such a configuration, when each compartment is divided for each phase, the size can be reduced, to facilitate manufacturing, assembling, and carrying-in operation.

As described above, in the gas-insulated switchgear according to embodiment 4, each compartment includes divisional compartments into which the compartment is divided for each phase, and the devices to be accommodated in each compartment are divided for respective phases to be accommodated in the respective divisional compartments. Therefore, in addition to the effect as described for embodiment 2 being obtained, manufacturing, assembling, and carrying-in operation are facilitated.

It is noted that, within the scope of the present invention, the above embodiments may be freely combined with each other, or each of the above embodiments may be modified or abbreviated as appropriate.

DESCRIPTION OF THE REFERENCE CHARACTERS 1 circuit breaker
1a one terminal
1b the other terminal
2 circuit breaker compartment
2a to 2c circuit breaker divisional compartment
3 driving shaft
4 circuit breaker operating mechanism
5 first disconnector
6 first cable
7 second cable
8 disconnector compartment
8a to 8c disconnector divisional compartment
9 disconnector operating mechanism
10 driving shaft
11 cable terminal
12 first connection compartment
12a to 12c first divisional connection compartment
13 cable terminal
14 second connection compartment
15 base frame
16 first connection compartment
17 second disconnector
18 second connection compartment
19 disconnector operating mechanism
20 driving shaft
21 instrument transformer
22 arrester

The invention claimed is:
1. A gas-insulated switchgear, wherein
a circuit breaker is accommodated in a circuit breaker compartment such that a contacting/separating direction of a contact of the circuit breaker is along a vertical direction,
a cable terminal of a first cable connected to one terminal of the circuit breaker is accommodated in a first connection compartment such that a central conductor of the cable terminal is along the vertical direction,
a cable terminal of a second cable connected to the other terminal of the circuit breaker directly or via a disconnector is accommodated in a second connection compartment such that a central conductor of the cable terminal is along the vertical direction, insulation gas is sealed in each of the containers, the first connection compartment and the second connection compartment are joined to the breaker container so as to be aligned horizontally in one direction or in opposite directions relative to the breaker container, and a circuit breaker operating mechanism for switching the circuit breaker is disposed on an outer side, of the breaker container, in the contacting/separating direction of the contact.

2. A gas-insulated switchgear, wherein a circuit breaker is accommodated in a breaker container such that a contacting/separating direction of a contact of the circuit breaker is along a vertical direction, a cable terminal of a first cable connected to one terminal of the circuit breaker via a first disconnector is accommodated in a first connection compartment such that a central conductor of the cable terminal is along the vertical direction, a cable terminal of a second cable connected to the other terminal of the circuit breaker directly or via a second disconnector is accommodated in a second connection compartment such that a central conductor of the cable terminal is along the vertical direction, insulation gas is sealed in each of the containers, the first connection compartment and the second connection compartment are joined to the breaker container so as to be aligned horizontally in one direction or in opposite directions relative to the breaker container, and a circuit breaker operating mechanism for switching the circuit breaker is disposed on an outer side, of the breaker container, in the contacting/separating direction of the contact.

3. The gas-insulated switchgear according to claim 1, wherein the cable terminal of the first cable and the cable terminal of the second cable are disposed so as to be oriented in opposite directions.

4. The gas-insulated switchgear according to claim 1, wherein the cable terminal of the first cable and the cable terminal of the second cable are disposed so as to be oriented in a same direction.

5. The gas-insulated switchgear according to claim 2, wherein the first disconnector is accommodated in a disconnector compartment such that a contacting/separating direction of a contact of the first disconnector is along the vertical direction, and the disconnector compartment has insulation gas sealed therein, and is joined so as to be disposed between the breaker container and the first connection compartment.

6. The gas-insulated switchgear according to claim 2, wherein the first disconnector is accommodated in the first connection compartment so as to be aligned with the cable terminal of the first cable in line such that a contacting/separating direction of a contact of the first disconnector is along the vertical direction, and the first connection compartment is joined to the breaker container on a side opposite to a side on which the second connection compartment is joined to the circuit breaker compartment.

7. The gas-insulated switchgear according to claim 6, wherein the other terminal of the circuit breaker and the cable terminal of the second cable are connected to each other via the second disconnector, and the second disconnector is accommodated in the second connection compartment so as to be aligned with the cable terminal of the second cable in line such that a contacting/separating direction of a contact of the second disconnector is along the vertical direction.

8. The gas-insulated switchgear according to claim 6, wherein an instrument transformer that is electrically connected to the other terminal of the circuit breaker is disposed on a side opposite to a side on which the second cable from the second connection compartment is led out.

9. The gas-insulated switchgear according to claim 6, wherein an arrester that is electrically connected to the other terminal of the circuit breaker is disposed on a side opposite to a side on which the second cable from the second connection compartment is led out.

10. The gas-insulated switchgear according to claim 1, wherein each of the containers includes divisional compartments into which each container is divided for each phase, and a device to be accommodated in each container is divided for each phase so as to be accommodated in the respective divisional compartments.

* * * * *